United States Patent
Tsai

(10) Patent No.: US 8,651,144 B1
(45) Date of Patent: Feb. 18, 2014

(54) TWO-SECTION VALVE CAP

(71) Applicant: Yao-Sha Tsai, Changhua (TW)

(72) Inventor: Yao-Sha Tsai, Changhua (TW)

(*) Notice: Subject to any disclaimer, the term of this patent is extended or adjusted under 35 U.S.C. 154(b) by 0 days.

(21) Appl. No.: 13/654,436

(22) Filed: Oct. 18, 2012

(51) Int. Cl.
F16L 55/10 (2006.01)

(52) U.S. Cl.
USPC ........... 138/89.2; 138/89; 138/89.3; 137/227; 73/146.8

(58) Field of Classification Search
USPC .......... 138/89, 89.1–89.4; 137/227, 557, 229; 73/146.8, 745
See application file for complete search history.

(56) References Cited

U.S. PATENT DOCUMENTS

| | | | | |
|---|---|---|---|---|
| 1,482,237 A * | 1/1924 | Lent | ............... | 137/227 |
| 3,592,218 A * | 7/1971 | Guy et al. | ............. | 137/227 |
| 3,720,224 A * | 3/1973 | Foxhall | ............. | 137/227 |
| 4,076,037 A * | 2/1978 | Perez | ............... | 137/230 |
| 4,557,308 A * | 12/1985 | Kuypers | ........... | 152/427 |
| 4,944,323 A * | 7/1990 | Bartholomew et al. | ........ | 137/227 |
| 5,040,561 A * | 8/1991 | Achterholt | ............. | 137/227 |
| 5,472,053 A * | 12/1995 | Sullaway et al. | ............. | 166/327 |
| 5,647,434 A * | 7/1997 | Sullaway et al. | ........... | 166/242.8 |
| 5,713,386 A * | 2/1998 | Heredia Batista et al. | ... | 137/233 |
| 5,819,779 A * | 10/1998 | Takemura et al. | ............ | 137/229 |
| 2009/0014073 A1 * | 1/2009 | Huang | ............. | 137/540 |

* cited by examiner

Primary Examiner — Patrick F Brinson

(57) ABSTRACT

A valve cap includes an internally threaded cap; a sleeve including external threads and an internal passage; a flexible, spring biased insert including a conic top in the passage of the sleeve for blocking, and a transverse bottom groove; a hollow first cylinder including external threads threadedly secured to the cap, internal threads secured to the external threads of the sleeve, and an internal passage; a hollow second cylinder including external threads, lower internal threads, and an internal passage; a moveable, flexible insert member including a conic top, a stem, and a transverse bottom groove; and a hollow, cylindrical positioning member including an axial channel and external threads threadedly secured to the internal threads of the insert member. Groove of the insert member communicates with both the channel of the positioning member and inside of the second cylinder.

1 Claim, 7 Drawing Sheets

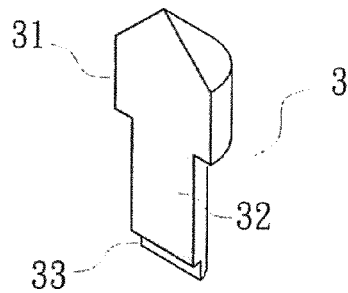
FIG. 1B
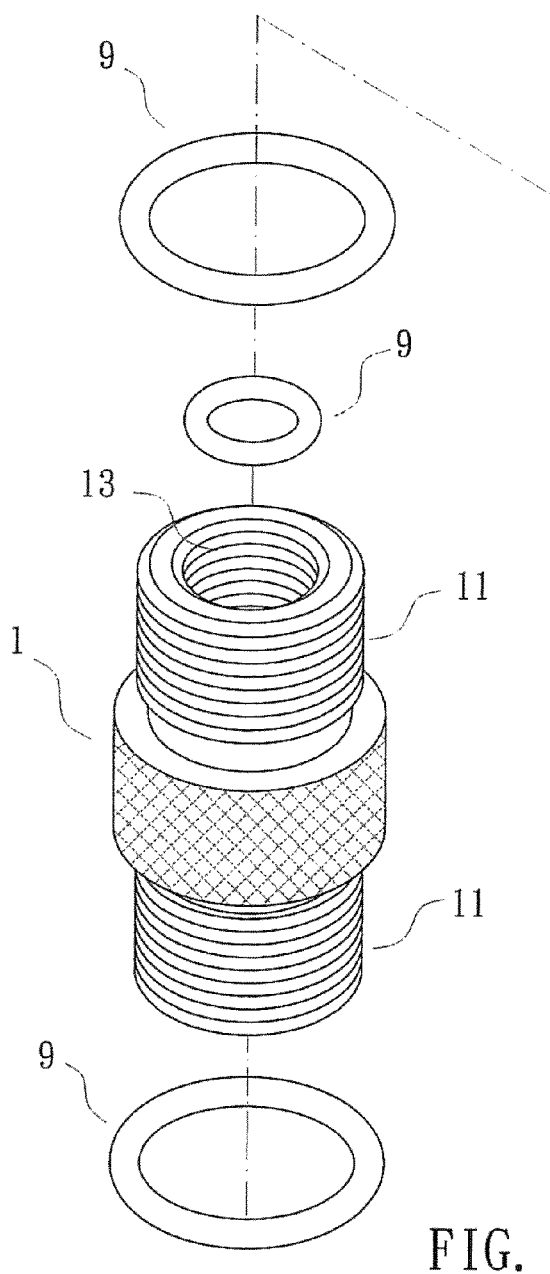
FIG. 1A
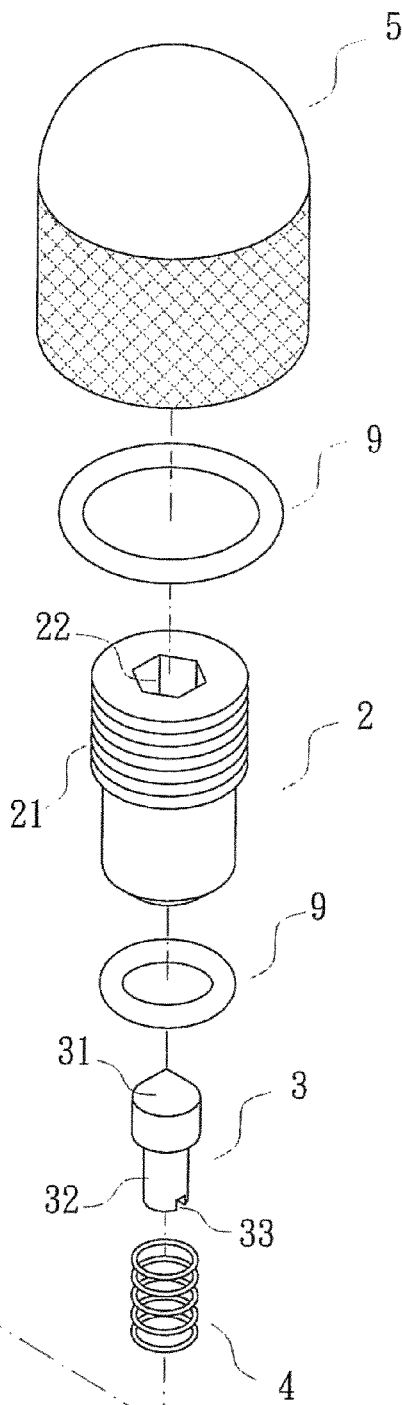

TWO-SECTION VALVE CAP

BACKGROUND OF THE INVENTION

1. Field of the Invention

The invention relates to tire valves and more particularly to a leak proof two-section valve cap adapted to mount on a tire valve of a bicycle wheel.

2. Description of Related Art

A conventional valve cap adapted to mount on a valve of a wheel tire comprises an upper sleeve portion having a central recess for accommodating a pair of pressure indicating inserts, a pair of inserts received in the recess, and a lower sleeve portion that is internally threaded and adapted to mate with a tire valve assembly, the inserts being removable from the recess and each displaying, on its upwardly facing surface, one digit of a desired inflation pressure, the inserts having a formation thereon which enable them to be snapped snugly in place within the recess in back to back relation.

Notwithstanding the conventional valve cap, the leak proof valve cap of the invention is neither taught nor rendered obvious thereby.

SUMMARY OF THE INVENTION

It is therefore one object of the invention to provide a valve cap comprising a cap comprising internal threads; a sleeve comprising external threads and an internal passage; a flexible, spring biased insert comprising a conic top disposed in the passage of the sleeve for blocking, and a transverse groove on a bottom; a hollow first cylinder comprising external threads threadedly secured to the internal threads of the cap, internal threads secured to the external threads of the sleeve, and an internal passage wherein the insert is slidable to dispose in a first position to block the passage of the first cylinder or a second position to cause the groove of the insert to communicate with both the passage of the first cylinder and inside of the first cylinder; a hollow second cylinder comprising external threads, lower internal threads, and an internal passage; a moveable, flexible insert member comprising a conic top, a stem projecting out of the top of the insert member, and a transverse groove on a bottom of the insert member wherein the insert member is disposed in the second cylinder with the passage of the second cylinder being blocked by the stem; and a hollow, cylindrical positioning member comprising an axial channel and external threads threadedly secured to the internal threads of the insert member to fasten the positioning member and the second cylinder together wherein the bottom of the insert member is engaged with the positioning member and the groove of the insert member communicates with both the channel of the positioning member and inside of the second cylinder.

The above and other objects, features and advantages of the invention will become apparent from the following detailed description taken with the accompanying drawings.

BRIEF DESCRIPTION OF THE DRAWINGS

FIG. 1A is an exploded view of components of a first configuration of a valve cap according to the invention;

FIG. 1B is a broken away perspective view of the insert of FIG. 1A;

DETAILED DESCRIPTION OF THE INVENTION

Figure 2:
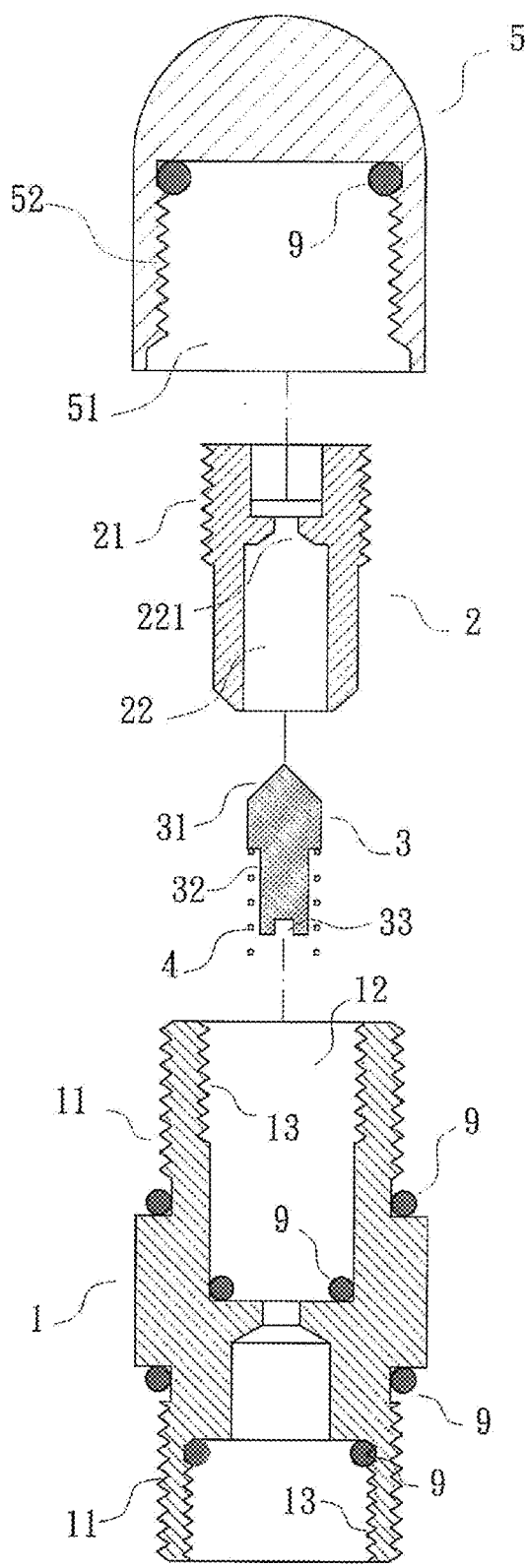
FIG. 2 is a longitudinal sectional view of the components of FIG. 1A to be assembled.
Figures 3A, 3B:
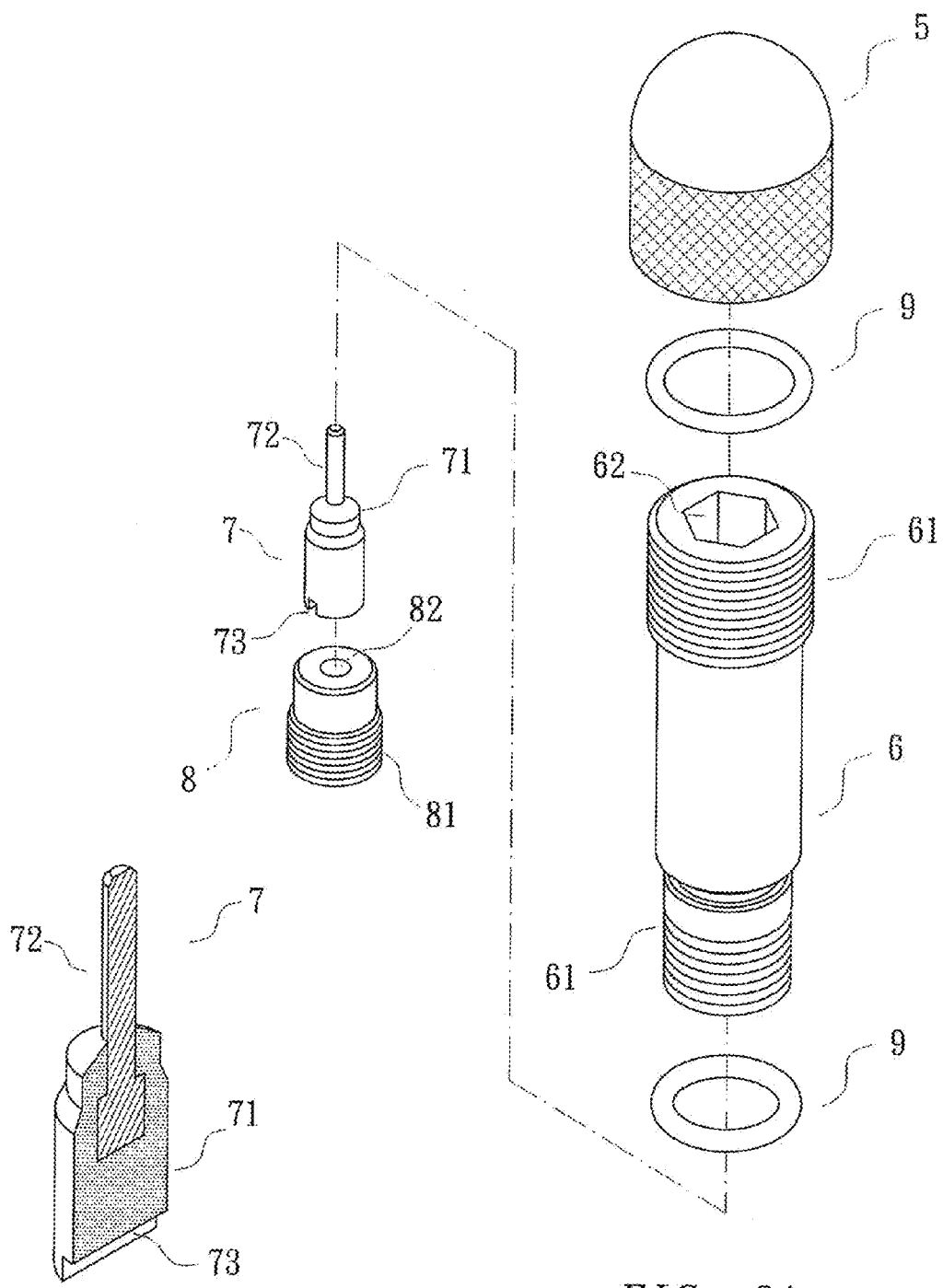
FIG. 3A is an exploded view of components of a second configuration of the valve cap according to the invention.
FIG. 3B is a broken away perspective view of the insert of FIG. 3A.
Figure 4:
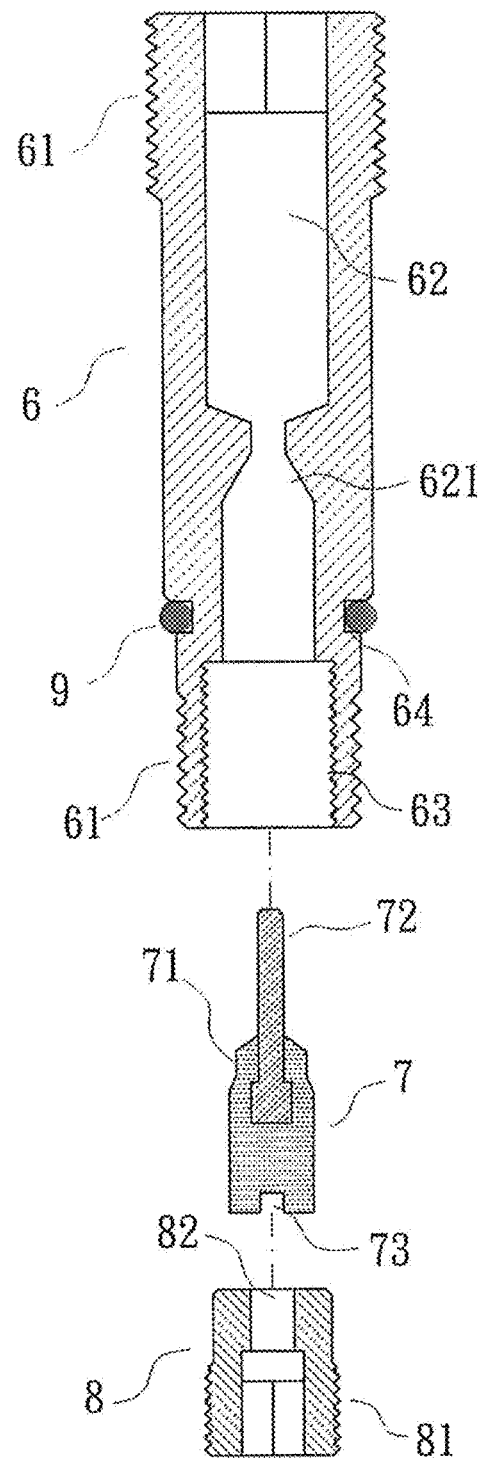
FIG. 4 is a longitudinal sectional view of the components of FIG. 3A to be assembled.
Figure 5:
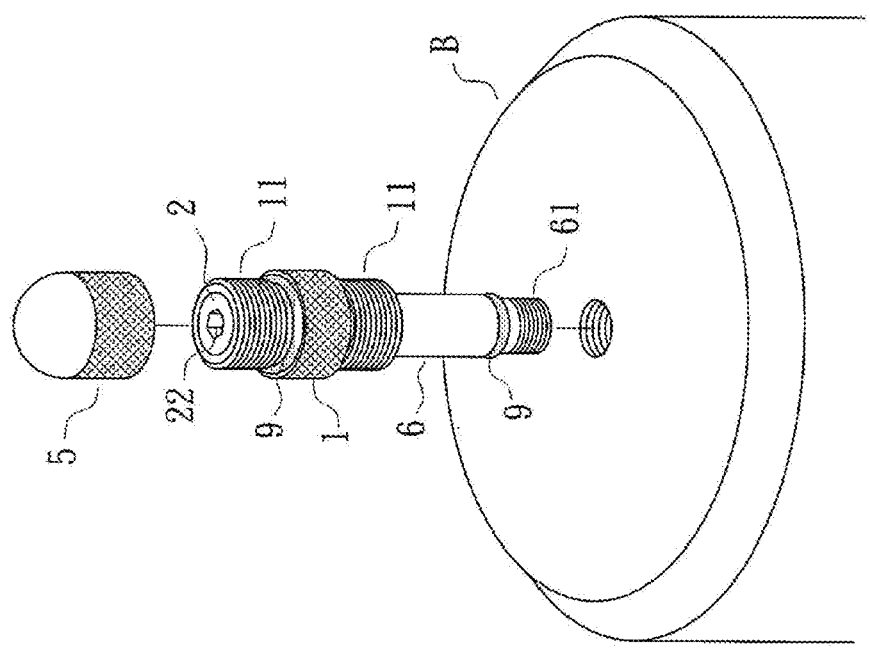
FIG. 5 is an exploded perspective view of the valve cap to be mounted on a tire valve in a first preferred embodiment of the invention.
Figure 10:
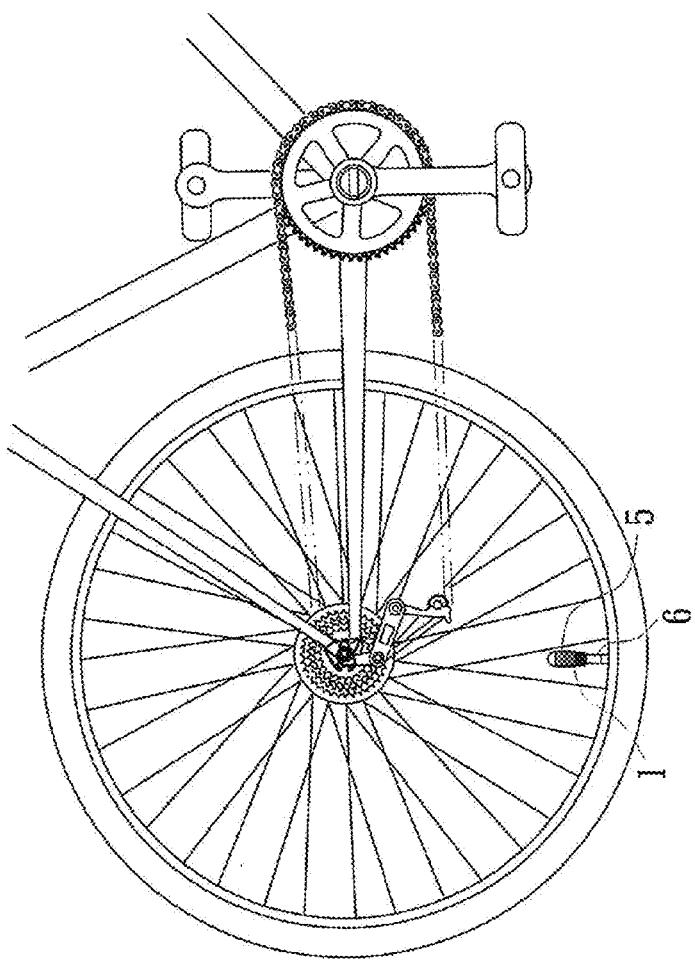
FIG. 10 is a perspective view showing the valve cap mounted on a tire valve of a rear wheel of a bicycle.
Figure 6:
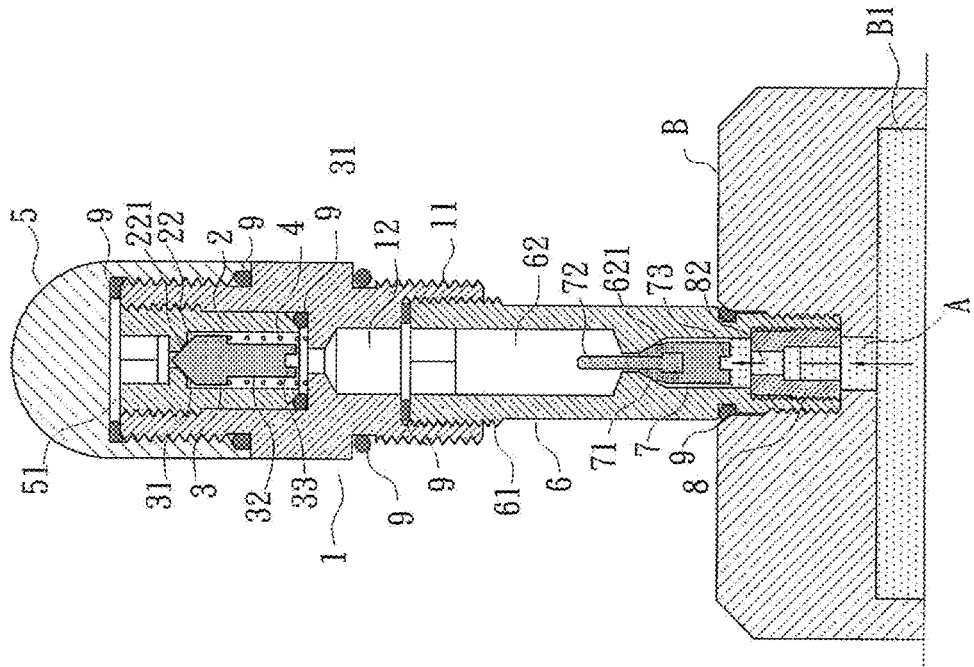
FIG. 6 is a longitudinal sectional view showing pressurized air fed through the mounted valve cap of FIG. 5 into the tire valve for inflation.
Figure 7:
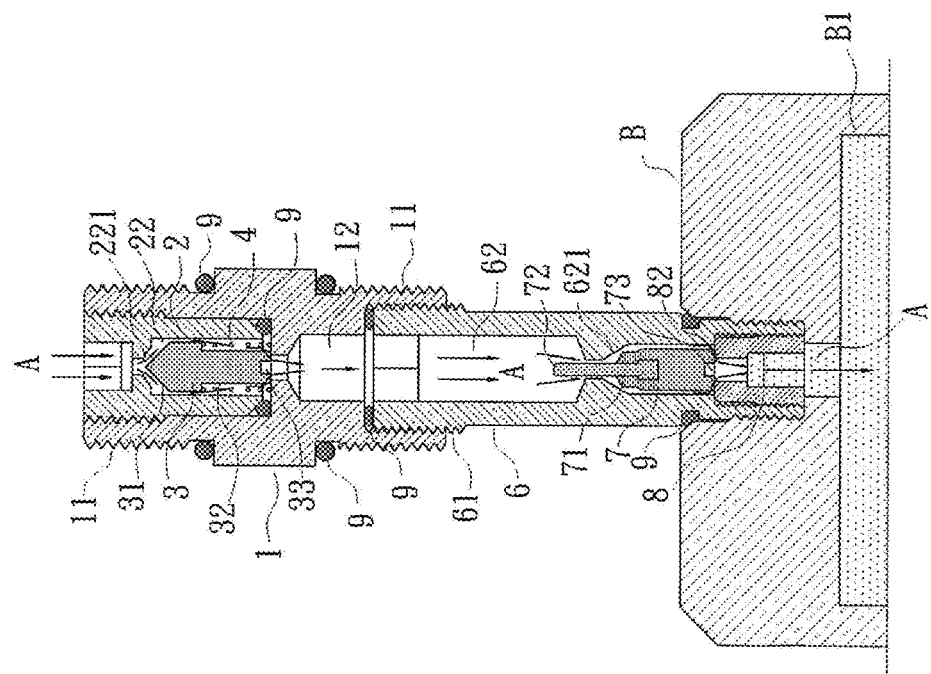
FIG. 7 is a view similar to FIG. 6 showing the cap being put on the valve cap after the inflation.

Referring to FIGS. 1A to 10, a valve cap in accordance with the invention comprises the following components as discussed in detail below.

A hollow first cylinder 1 comprises external threads 11, internal threads 13, and an internal passage 12 communicating upper space of the first cylinder 1 and lower space of the first cylinder 1. A cap 5 comprises an internal space 51 and internal threads 52. A sleeve 2 comprises external threads 21, an internal space 22, and an internal passage 221 communicating upper portion of the space 22 and lower portion of the space 22. An insert 3 made of plastic comprises a conic top 31, a cylindrical body 32, and a transverse groove 33 on the bottom. A compression spring 4 is put on the body 32. The insert 3 is disposed in the lower portion of the space 22 with the passageway 221 being blocked by the top 31. The external threads 21 and the upper portion of the internal threads 13 are threadedly secured together when the sleeve 2 is inserted into an upper portion of the first cylinder 1. Also, the bottom of the insert 3 is in the passage 12 (i.e., the groove 33 communicating with both the passage 12 and inside of the first cylinder 1). The internal threads 52 and an upper portion of the external threads 11 are threadedly secured together when the cap 5 is put on an upper portion of the first cylinder 1.

A hollow second cylinder 6 comprises external threads 61, a space 62, lower internal threads 63, and a passage 621 communicating an upper portion of the space 62 with a lower portion of the space 62. An insert member 7 made of plastic comprises a conic top 71, a stem 72 projecting out of the top 71, and a transverse groove 73 on the bottom. The insert member 7 is disposed in the space 62 with the passage 621 being blocked by the stem 72 or not. A hollow, cylindrical positioning member 8 comprises an axial channel 82 and external threads 81 threadedly secured to the internal threads 63 for fastening the positioning member 8 and the second cylinder 6 together. The bottom of the insert member 7 is engaged with the positioning member 8 (i.e., the groove 73 communicating with both the channel 82 and inside of the first cylinder 6). The internal threads 52 and an upper portion of the external threads 61 are threadedly secured together when the cap 5 is put on an upper portion of the second cylinder 6.

Finally, a plurality of sealing rings (e.g., O-rings) 9 are provided in the components of above two paragraphs for preventing air from leaking.

In a first preferred embodiment shown in FIGS. 5, 6, 7 and 10, a lower portion of the internal threads 13 are threadedly secured to an upper portion of the external threads 61 to fasten the first cylinder 1 and the second cylinder 6 together. Also, the cap 5 is fastened on an upper portion of the external threads 11. A lower portion of the external threads 61 are threadedly secured to internal threads of a tire valve B of, for example, a bicycle wheel.

In an inflation operation, the cap 5 is removed first. Next, pressurized air A from an air pump (not shown) is fed into an internal channel B1 of the tire valve B via the first cylinder 1, the passage 221, the passage 12, the second cylinder 6, and the passages 621 with the spring 4 compressed, the top 31 disengaged from the passage 221, and the stem 72 disengage from the passage 621 (see FIG. 6). After the inflation, the passages 221, 12, and 621 are blocked again and all previously displaced components are returned to their inoperative positions. Thereafter, the cap 5 can be put on the first cylinder 1 by threading (see FIG. 7).

Figure 8:
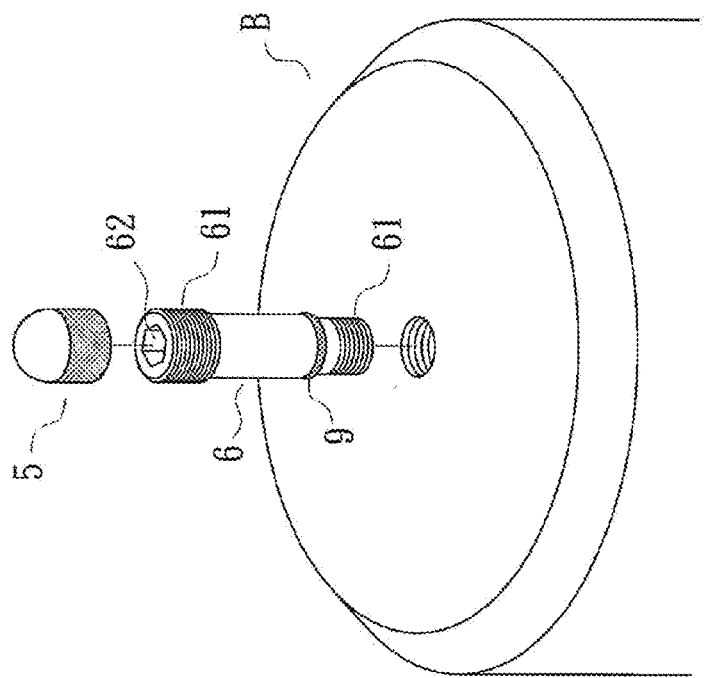
FIG. 8 is an exploded perspective view of the valve cap to be mounted on the tire valve in a second preferred embodiment of the invention.

Alternatively, in a second preferred embodiment shown in FIG. 8, a lower portion of the external threads 11 is threadedly secured to internal threads of a tire valve B and the cap 5 is put on the first cylinder 1 by threading.

Figure 9:
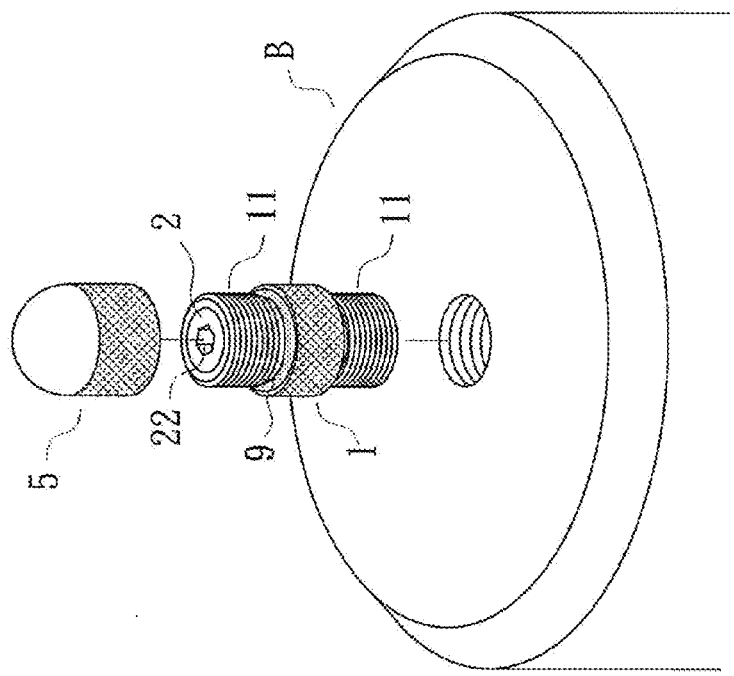
FIG. 9 is an exploded perspective view of the valve cap to be mounted on the tire valve in a third preferred embodiment of the invention.

Still alternatively, in a third preferred embodiment shown in FIG. 9, a lower portion of the external threads 61 are threadedly secured to internal threads of a tire valve B and the cap 5 is put on the second cylinder 6 by threading.

While the invention has been described in terms of preferred embodiments, those skilled in the art will recognize that the invention can be practiced with modifications within the spirit and scope of the appended claims.

What is claimed is:

1. A valve cap comprising:

a cap comprising internal threads;

a sleeve comprising external threads and an internal passage;

a flexible, spring biased insert comprising a conic top disposed in the passage of the sleeve for blocking, and a transverse groove on a bottom;

a hollow first cylinder comprising external threads threadedly secured to the internal threads of the cap, internal threads secured to the external threads of the sleeve, and an internal passage wherein the insert is slidable to dispose in either a first position to block the passage of the first cylinder or a second position to communicate the groove of the insert with both the passage of the first cylinder and inside of the first cylinder;

a hollow second cylinder comprising external threads, lower internal threads, and an internal passage;

a moveable, flexible insert member comprising a conic top, a stem projecting out of the top of the insert member, and a transverse groove on a bottom of the insert member wherein the insert member is disposed in the second cylinder with the passage of the second cylinder being blocked by the stem; and a hollow, cylindrical positioning member comprising an axial channel and external threads threadedly secured to the internal threads of the insert member to fasten the positioning member and the second cylinder together wherein the bottom of the insert member is engaged with the positioning member and the groove of the insert member communicates with both the channel of the positioning member and inside of the second cylinder.

\* \* \* \* \*